United States Patent [19]
Kakuta

[11] Patent Number: 4,926,638
[45] Date of Patent: May 22, 1990

[54] NEGATIVE PRESSURE AIR STREAM ACCELERATOR OF SUCTION TYPE AIR COOLING MECHANISM FOR INTERNAL COMBUSTION ENGINE

[76] Inventor: Yoshiaki Kakuta, 1-8-1, Hamakawado, Kasukabe-Shi, Saitama-Ken, Japan

[21] Appl. No.: 210,857

[22] Filed: Jun. 24, 1988

[30] Foreign Application Priority Data

Dec. 3, 1987 [JP] Japan .................. 62-306684

[51] Int. Cl.⁵ .............................................. F02B 35/00
[52] U.S. Cl. .................................... 60/319; 123/41.64
[58] Field of Search ............. 60/317, 319; 123/41.64

[56] References Cited

U.S. PATENT DOCUMENTS

| | | | |
|---|---|---|---|
| 1,025,251 | 5/1912 | Desmond | 123/41.64 |
| 1,473,668 | 11/1923 | Byrnes | 123/41.64 |
| 2,586,788 | 2/1952 | Cushman | 60/317 |
| 4,060,985 | 12/1977 | Fukushima | 60/319 |

FOREIGN PATENT DOCUMENTS

| | | | |
|---|---|---|---|
| 258 | of 1914 | United Kingdom | 60/319 |
| 292355 | 6/1928 | United Kingdom | 60/319 |

*Primary Examiner*—Douglas Hart
*Attorney, Agent, or Firm*—Fleit, Jacobson, Cohn, price, Holman & Stern

[57] ABSTRACT

A negative pressure air stream accelerator for a suction type air cooling mechanism for cooling an internal combustion engine produces negative pressure by accelerating the exhaust gas stream to form a strong negative pressure connected to the cooling device to draw cooling air therethrough, and accelerates the velocity of the exhaust gas by providing at least one stage of acceleration units for throttling by a reduced cross-sectional area of the exhaust gas passage having an outer casing connected to the cooling device, the accelerator having holes through the walls thereof communicating with the interior of the casing. A plurality of stages are provided in series for utilizing the air stream accelerated to a high velocity at the final negative pressure stream.

18 Claims, 3 Drawing Sheets

NEGATIVE PRESSURE AIR STREAM ACCELERATOR OF SUCTION TYPE AIR COOLING MECHANISM FOR INTERNAL COMBUSTION ENGINE

RELATED APPLICATIONS

This application relates to copending applications Ser. No. 07/195,834, filed May 19, 1988, pending Ser. No. 07/219,247 filed July 15, 1988, now U.S. Pat. No. 4,864,823 and Ser. No. 07/219,248 filed July 15, 1988 pending.

BACKGROUND OF THE INVENTION

1. Field of the Invention

This invention relates to a negative pressure air stream accelerator for an air cooling mechanism of an engine for forcibly cooling the inner core of an engine with atmospheric air through the engine.

2. Description of the Prior Art

An internal combustion engine of the air cooled type is known, and is particularly used frequently in an engine of small size and heat generation. Internal combustion engines of large size for automobiles frequently employ liquid cooling using coolant, such as water. Since the boiling point temperature of the liquid is lower than the heat generated from the engine so that it is less difference from the normal temperature of the engine when the engine is rotated. Thus, when the load of the engine is increased or the engine is continuously operated at a high speed, the coolant immediately arrives at the boiling point so that the engine is feasibly overheated. Another disadvantage of the liquid cooling type is that the structure is complicated, seals for preventing the liquid from leaking under temperature changes up to approximately. 100° C. must be provided, coolant quantity and components must be managed, and maintenance is troublesome.

In the liquid cooled type engine, the temperature of the cooling liquid is lowered by a radiator connected to the engine, in which the heat of the cooling liquid is exchanged to the air. Atmospheric air temperature averages approximately. 20° C. and approximately 50° C. under the most severe conditions. This temperature is much lower than the boiling point of the cooling liquid of conventional cooled engines, and the air is available without limit.

BRIEF SUMMARY OF THE INVENTION

The present inventor has performed studies and development of the technique for air-cooling directly the internal core of the engine from the point of view described above.

As a result, the inventor has discovered the fact that directly cooling the internal core of an engine not by natural air cooling as in existing air cooling types but by forcible air cooling is excellent, and has completed a suction type air cooling system. This system has features which provides an air jacket in a section corresponding to a water jacket of a liquid-cooled type engine and introduces atmospheric air directly to the air jacket to cool it. The atmospheric air is introduced by by means of negative pressure formed by the energy of exhaust gas to draw in cooling air through the engine intake. Therefore, when the energy of the exhaust gas is low, intake negative pressure is low and as the energy of the exhaust gas is increased, the intake negative pressure is proportionally increased.

The present inventor has further discovered from the progress of studies and tests of suction type forced air cooling systems the fact that the mounting position of a negative pressure generator, the structure of the negative pressure generator and the process of the negative pressure air stream are important to efficiently and effectively form the negative pressure, and that the flow velocity of the negative pressure air stream can be remarkably enhanced by improvements of the above-mentioned important factors. More specifically, the intake energy can be extremely enhanced by extremely accelerating the negative pressure air stream. According to experiments, the air stream can be accelerated to the stage of an extremely high flow velocity at the time of operating the engine at a high speed.

An object of this invention is to provide a negative pressure source for a suction type air cooling mechanism for an internal combustion engine which is obtained by a highly accelerated exhaust air stream which is utilized in accordance with the invention to produce remarkably effectively forcibly air cooling for the engine.

The above object of the invention is achieved in accordance with the invention by a negative pressure air stream accelerator in a suction type air cooling mechanism for an internal combustion engine for guiding atmospheric air sucked by a negative pressure generator provided in an exhaust gas system to the body of the internal combustion engine to air-cool the internal combustion engine, comprising an at least one stage acceleration unit for throttling a passage sectional area provided in the exhaust gas system in a direction of exhaust gas stream in such a manner that the acceleration unit is increased in volume at the rear end thereof, an air inlet provided near the acceleration unit, and a duct connected at the rear end to a casing covering the same for exhausting the air cooling the internal combustion engine.

The air inlet is provided after one or more acceleration units, and is most preferably provided by a uniform plurality of holes in a circumferential direction.

The negative pressure generator is provided in the exhaust gas system of the engine, generally at a position downstream having less rear resistance, or downstream from the position of a muffler, and at the best to provide the generator at the lowermost part of the exhaust air stream. This is because it prevents the accelerated negative pressure air stream from being again affected by the resistance due to the muffler to eliminate the deceleration of the air stream and the reduction of the suction energy.

One or more stages of negative pressure generators are constructed. In case of three stages, for example, first, second and third accelerators are disposed longitudinally progressively downstream. Thus, since the volumes of the atmospheric air sucked through a duct immediately after the respective accelerators are added together, the volumes are sequentially increased from the first accelerator to the second accelerator, and from the second to the third accelerator, thereby obtaining accelerated suction air streams at a plurality of stages.

The necessity of the degree of increasing the volume is not unitarily determined according to the characteristics of the engine. However, the increase in the volume of the air stream is set so that the internal pressure of the second accelerator is added with the accelerated suction air stream fed from the first air inlet to the internal pressure and the flow rate of the air stream in the first accelerator is set lower than that of the second accelerator. Thus, the flow velocity of the air stream in the first air inlet is not decelerated by resistance of the second accelerator. In any case, volume increasing means can be easily determined according to experiments by considering that the means copes with the quantity of the air stream fed from an air exhaust duct into a casing and from air inlets for the accelerator units.

According to the present invention as described above, the negative pressure air stream accelerator achieves the object of the accelerating the negative pressure air stream in the suction type air cooling mechanism to an ultrahigh speed to form a negative pressure necessary by the high speed air stream, thereby remarkably enhancing the atmospheric air intake effect. As a result, it can effectively suck low temperature cooling air and very smoothly exhaust cooled air to thus prove the cooling effect according to the present invention. The efficiency of the entire mechanism can be maximized by obtaining necessary negative pressure by intake of cooling air by means of utilizing exhaust gas because the utility efficiency of the engine output is not lowered due to the formation of the negative pressure by producing electric power and rotary force from the engine by rotating a fan.

The negative pressure air stream accelerator of this invention utilizes exhaust gas energy to extremly accelerate the exhaust gas in the accelerator to form a negative pressure energy. Thus, the formation of the negative pressure is affected by the rotating speed of the engine, while the exhaust gas energy at the time of operating the engine with the load is converted to the suction energy by the negative pressure generator, and air cooling effect immediately responsive to the actual operating conditions of the engine is obtained. Further, the exhaust gas temperature can be extremely effectively lowered by this invention, and a large quantity of air is mixed. As a result, detrimental substance concentration in the exhaust gas can be remarkably reduced.

BRIEF DESCRIPTION OF THE DRAWINGS

The invention will now be described in greater detail with reference to the accompanying drawings wherein.

DESCRIPTION OF THE PREFERRED EMBODIMENTS

Figure 1:
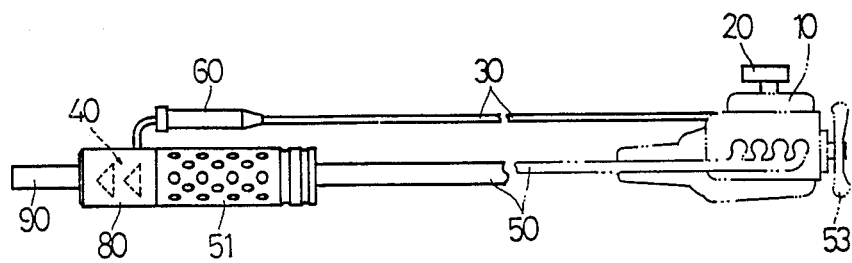
FIG. 1 is a schematic elevational view of the entire mechanism of a negative pressure air stream accelerator of a suction type air cooling mechanism for an internal combustion engine of an embodiment according to the present invention.
Figure 2:
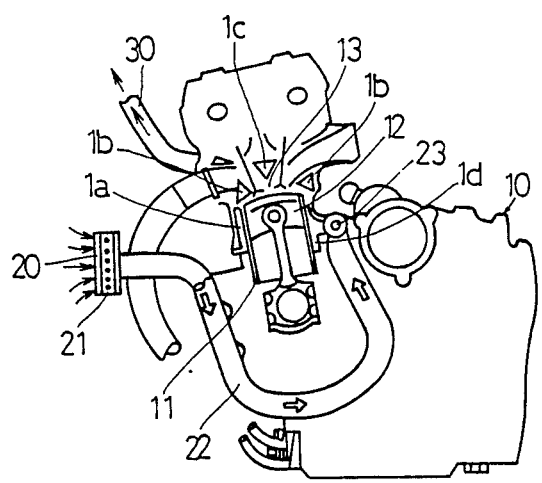
FIG. 2 is a schematic cross-sectional view of the engine body.

The invention will be described with respect to an embodiment of a negative pressure air stream accelerator of a suction type air cooling mechanism for an internal combustion engine.

In the drawings, reference numeral 10 designates a body of an internal combustion engine in which an air cooling mechanism of the invention is employed, numeral 20 denotes an atmospheric air inlet, numeral 30 depicts a duct for exhausting heated air after heat exchanging, numeral 40 indicates a negative pressure generator, provided downstream of the muffler 51 of an exhaust gas piping system 50. Numeral 60 designates a reverse silencer. Air jackets 1a, 1b, 1c, 1d, . . . are so provided in the engine body 10 as to surround the heat generation units, such as cylinder 11, piston 12, cylinder head 13, etc. Atmospheric air is introduced through inlet 20, cleaned by filter 21, and then introduced through air inlet conduit 22 and one or more ports 23 into all the air jackets 1a, 1b, 1c, 1d, . . . A conduit, i.e., an atmospheric air exhaust duct 30 for exhausting the air after heat exchanging is connected to the air jackets 1a, 1b, 1c, 1d, . . .

Figure 3:
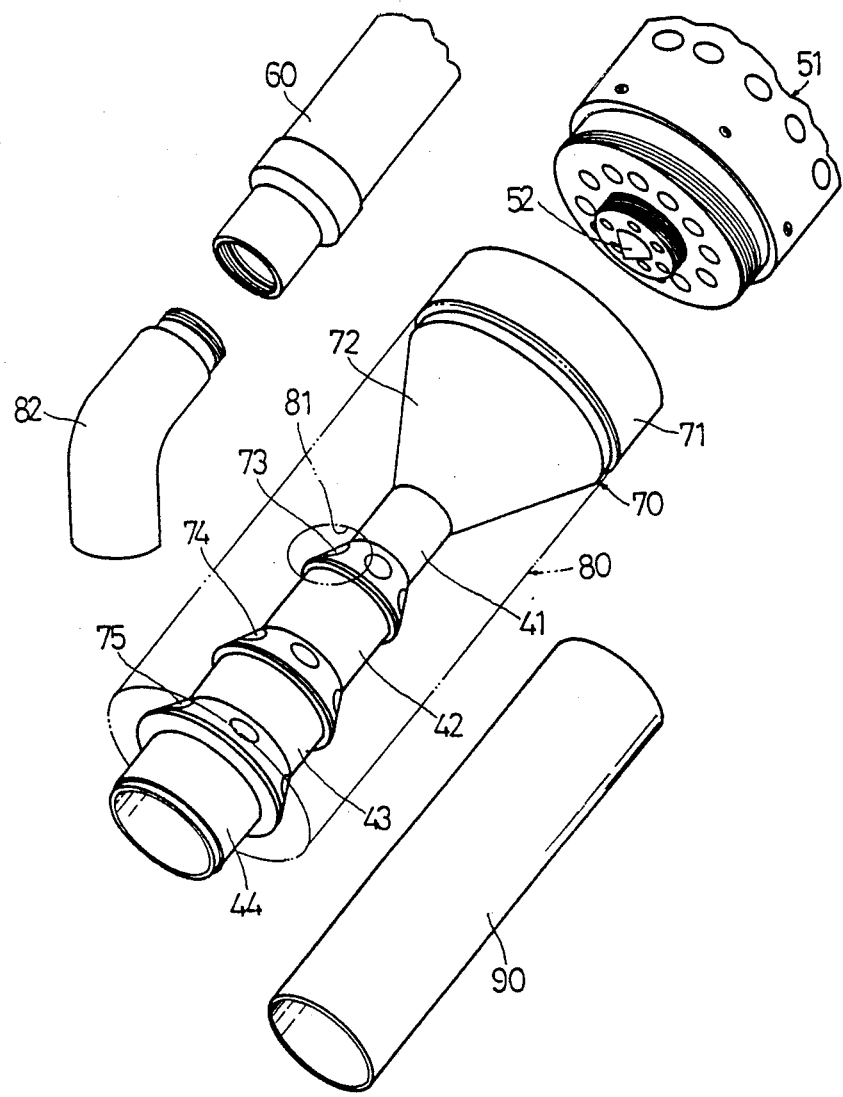
FIG. 3 is an exploded perspective view of the accelerator.
Figure 4:
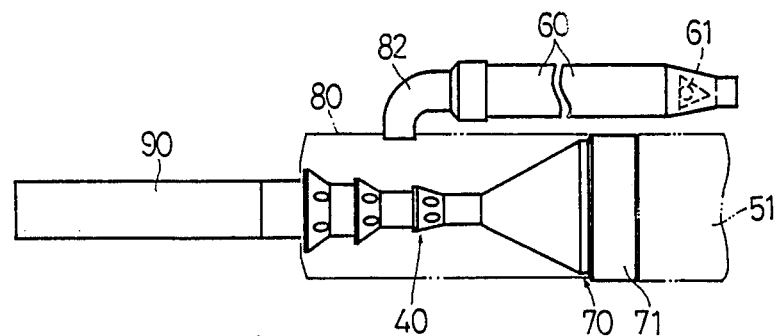
FIG. 4 is a schematic side elevational view of the accelerator.
Figure 5:
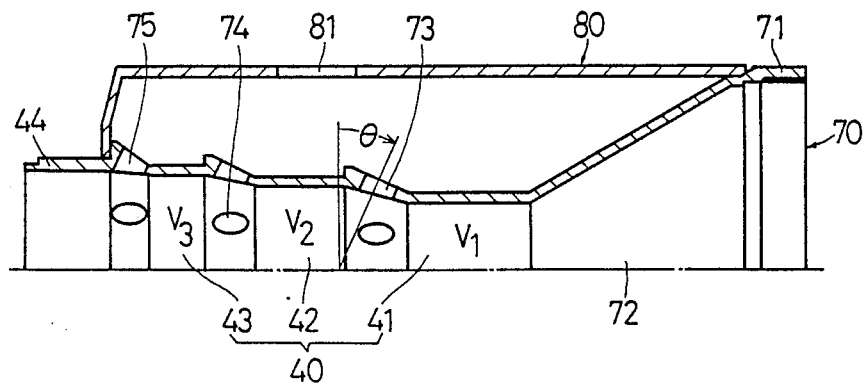
FIG. 5 is a longitudinal cross sectional view of the preferred embodiment of the accelerator of the invention.

The accelerator is shown in FIGS. 3 to 5, and has an acceleration cylinder 70 and a casing 80. The acceleration cylinder 70 has a tapered conduit 72 throttled at the minimum in its bore from a connector 71 of large diameter at the front end thereof connected to the muffler 51, a first acceleration unit 41, a first air inlet 73, a second acceleration unit 42, a second air inlet 74, a third acceleration unit 43, a third air inlet 75 and a connector 44 sequentially disposed longitudinally downstream, and a tail tube 90 is connected to the downstream end of connector 44. Numeral 81 designates an opening formed in the casing 80, and a reverse flow preventing silencer 60 is connected through a connector pipe 82 thereto.

The volume $V_1$ of the first acceleration unit 41 is set in volume necessary to obtain a primary accelerated stream for throttling the exhaust gas stream velocity to the minimum in the tapered conduit 72. The volumes of the second and third acceleration units 42, 43 of the embodiment are increased in the relationship to become $V_2 = AV_1$, $V_3 = BV_2$ ($A = B = 2$). Of course, the coefficients A and B may take other arbitrary numeric values. The bore of the tail tube 90 is larger than the bore of the third acceleration unit 43. The first to third air inlets 73, 74, 75 are formed preferably with forward angle $\theta$. The angle $\theta$ is larger than "0" and less than 90°, and preferably in a range of 10° to 30°. The number of holes and the bores of the inlets 73 to 75 are so set as to introduce the atmospheric air from the air exhaust duct 30 at a high speed.

In a 4-cycle engine for a motorcycle having an engine with a 750 cc displacement, preferable results were obtained with a 10 to 40 mm first acceleration unit diameter and a 50 to 300 mm tail tube length. In 3-stage accelerators as shown, the air streams in the connector pipe 82 and air inlets 73 to 75 have achieved a high velocity.

The muffler 51 and a known reverse silencer 60 are of the type wherein triple and single bypass passages are provided around a main passage for silencing. The reverse silencer 60 has a check valve 61 for preventing the exhaust sound from the negative pressure generator 40 from reversely flowing and momentary pressure pulsation from occurring. Numeral 52 designates a low speed torque generator provided at the rear end of the muffler 51 for throttling the exhaust gas passage in the muffler 51 to improve the torque at low speed. A cooling fan 53 is unnecessary, but, if used serves to cool the exterior of the engine.

OPERATION OF THE INVENTION

In the negative pressure air stream accelerator of the invention described above, when the engine is operated, an exhaust gas stream exhausted through the exhaust gas piping system 50 is accelerated by the accelerator, and the negative pressure in an amount responsive to the flowing velocity is formed in the negative pressure generator 40. As a result, the flow of cooling air directed from the atmospheric air inlet 20 through the jackets 1a, 1b, 1c, 1d, . . ., and exhaust duct 30 toward the negative pressure generator 40 is forcibly generated, thereby air-cooling the engine as required.

In the negative pressure generator 40, first abrupt acceleration is obtained in the first acceleration unit 41 connected to tapered conduit 72, and the exhaust air is then sequentially accelerated at higher speed over the additional stages of second and third acceleration units 42, 43. Thus, the air stream achieves a high velocity at the maximum speed. It is well known in aerodynamics that an air current can have the velocity thereof increased to a higher velocity in accordance with Bernoulli's theorem that a high-speed current can be obtained in an air stream by changing the pressure head to a velocity head. Elements 72 and 41–43 comprise a type of Laval nozzles and by the characteristic nozzle shape down produce an extremely high air stream velocity. The energy source utilized is the high-pressure exhaust gas stream produced by the operation of the engine which is passed through the exhaust gas system. The inventor has found that in order to attain the desired exhaust gas velocity necessary to operate the invention, the cross-sectional area of the exhaust gas stream must be reduced to a predetermined amount. The provision of a diverging frustoconical section in the exhaust flow system after, or downstream of, the aforesaid predetermined reduced cross-sectional area, and connecting the diverging section to the air cooling system of the engine produces significant and substantial negative pressure which draws air through the cooling system positively to produce substantially greater cooling than heretofore realized.

From this it has been found that air may be drawn in through pipe element 30 by the connections 81 through casing 80 and holes 73 through a first frustoconical section, and this can be gradually increased by the plurality of additional acceleration portions 42, 43 and holes 74, 75 through the succeeding frustoconical sections following the first acceleration portion 41.

Then, the exhaust gas flow rate is also increased, and the negative pressure reaches approximately 3 bar. More specifically, the energy necessary for penetrating 40 to 80 sheets of tissue paper at the connection port of the reverse silencer 60 to the connector pipe 82 was obtained in the experiments. This strong intake action is obtained by accelerating the air stream highly by utilizing the exhaust gas stream with the invention.

I claim:

1. A negative pressure air stream generator for a suction type air cooling mechanism of an internal combustion engine for drawing atmospheric air through the cooling mechanism by negative pressure produced by the exhaust gas stream in the exhaust system comprising:
    a continuous tubular acceleration means having a reducing section for decreasing the cross-sectional area and increasing velocity of the exhaust gas stream, and at least two stages, each stage comprising a volume increasing section for increasing the cross-sectional area of the exhaust gas stream downstream of said reducing section, and a substantially constant diameter axially extending section downstream of said volume increasing section;
    a casing surrounding said acceleration means;
    a duct having a front end connected to the air cooling mechanism and a rear end connected to said casing and communicating with the interior thereof; and
    means communicating the interior of said casing with the exhaust gas stream passing through said volume increasing section of each of said stages.

2. A negative pressure generator as claimed in claim 1 wherein said states are operatively connected in series, the constant diameter section and volume increasing section of each of said stages being larger than that of the preceding stage.

3. A negative pressure generator as claimed in claim 1 wherein said means communicating said interior of said casing with the exhaust gas stream comprises air inlets provided at a plurality of positions around the periphery of said volume increasing section of each stage.

4. A negative pressure generator as claimed in claim 2 wherein said means communicating said interior of said casing with the exhaust gas stream comprises air inlets provided at a plurality of positions around the periphery of each volume increasing section of each stage.

5. A negative pressure generator as claimed in claim 2 and further comprising:
    a rear tube connected to the final acceleration stage and having a cross-sectional area larger than the cross-sectional area of the volume increasing section of said final stage.

6. A negative pressure generator as claimed in claim 4 and further comprising:
    a rear tube connected to the last acceleration unit and having a cross-sectional area larger than the cross-sectional area of the volume increasing section of said final stage.

7. A negative pressure generator as claimed in claim 1 and further comprising:
    a silencer in said duct; and
    a reverse flow preventing means in said silencer for preventing exhaust gas sound and pulsating air stream from backflowing through said duct.

8. A negative pressure generator as claimed in claim 6 and further comprising:
    a silencer in said duct; and
    a reverse flow preventing means in said silencer for preventing exhaust gas sound and pulsating air stream from backflowing through said duct.

9. A negative pressure generator as claimed in claim 1 wherein:
    a muffler is provided in the exhaust gas system; and
    said accelerator means is disposed downstream of said muffler.

10. A negative pressure generator as claimed in claim 8 wherein:
    a muffler is provided in the exhaust gas system; and
    said acceleration means is disposed downstream of said muffler.

11. A negative pressure generator as claimed in claim 1 wherein:
    said muffler has an outlet end; and
    said acceleration means is connected to said outlet end of said muffler.

12. A negative pressure generator as claimed in claim 10 wherein:
said muffler has an outlet end; and
said acceleration means is connected to said outlet end of said muffler.

13. A negative pressure generator as claimed in claim 1 wherein:
said reducing section comprises a hollow substantially frustoconically shaped member having the smaller cross-sectional end thereof downstream of the larger cross-sectional end thereof;
a first tubular member is provided extending downstream from said smaller cross-sectional end of said reducing section and having a downstream outlet end; and
said volume increasing section comprises a second hollow substantially frustoconically shaped member having the smaller cross-sectional end thereof connected to said outlet end of said tubular member.

14. A negative pressure generator as claimed in claim 13 wherein:
said volume increasing section further comprises a plurality of holes through said second hollow substantially frustoconically shaped member for communicating the interior thereof with said interior of said casing.

15. A negative pressure generator as claimed in claim 14 wherein:
a second stage is provided comprising a substantially tubular member extending downstream from the larger cross-sectional end of said second hollow substantially frustoconically shaped member, a third hollow substantially frustoconically shaped member having the smaller cross-sectional end thereof extending from the downstream end of said second substantially tubular member, and a plurality of holes through said third hollow substantially frusto-conically shaped member for communicating the interior thereof with said interior of said casing.

16. A negative pressure generator as claimed in claim 15 wherein:
a muffler is operatively connected to said exhaust system pipe; and
said acceleration means is disposed in series downstream of said muffler.

17. A negative pressure generator as claimed in claim 9 wherein:
said reducing section comprises a hollow substantially frustoconically shaped member having the smaller cross-sectional end thereof downstream of the larger cross-sectional end thereof;
a first tubular member is provided extending downstream from said smaller cross-sectional end of said reducing section and having a downstream outlet end; and
said volume increasing section comprises a second hollow substantially frustoconically shaped member having the smaller cross-sectional end thereof connected to said outlet end of said tubular member.

18. A negative pressure generator as claimed in claim 17 wherein:
the larger cross-sectional end of said reducing section hollow substantially frustoconically shaped member is connected to the downstream end of said muffler; and
said casing has one end connected to said larger cross-sectional end of said reducing section hollow substantially frustoconically shaped member.

* * * * *